UNITED STATES PATENT OFFICE.

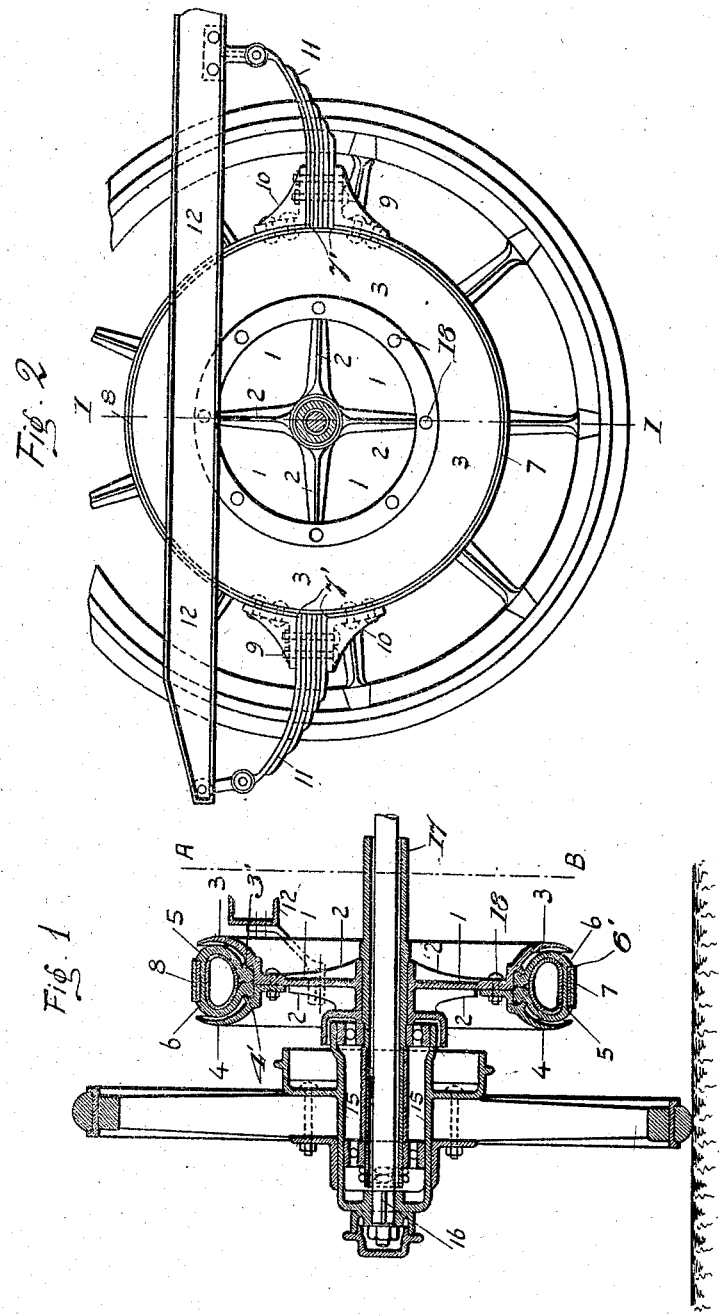

LORENZO BASSO, OF GENOA, ITALY.

ELASTIC SUSPENSION FOR VEHICLES.

948,689.   Specification of Letters Patent.   Patented Feb. 8, 1910.

Application filed March 5, 1909. Serial No. 481,530.

*To all whom it may concern:*

Be it known that I, LORENZO BASSO, engineer and architect, a subject of the King of Italy, residing at Genoa, Italy, have invented a new and useful Elastic Suspension for Vehicles, of which the following is a specification.

This invention relates to improvements in elastic suspensions for vehicles wherein the usual springs are employed in connection with a yielding or pneumatic member.

According to my invention the pneumatic member is mounted upon the axles of the vehicle and the springs are connected with the frame of the vehicle and also with the pneumatic member and the connection between the pneumatic member and the springs is symmetrically arranged with respect to the former and the springs are symmetrically arranged with respect to the pneumatic member in a manner to provide for neutralizing comparatively slight jars and to render the imposition of the load on the pneumatic member entirely uniform.

The invention will be more fully described in connection with the accompanying drawing and will be more particularly pointed out in and by the appended claims.

In the drawing:—Figure 1 is a sectional view on line 1—1 of Fig. 2. Fig. 2 is a sectional view on lines A—B of Fig. 1.

Like numerals of reference designate similar parts throughout the different figures of the drawing.

One axle of a vehicle is designated at 16, and may be provided with any desired construction of antifriction hub 15 for the wheel. As shown a sleeve 17 surrounds the axle and provides a mounting for a pneumatic supporting member designated at 1. Said supporting member may be provided with strengthening ribs 2 and, as shown, said member extends radially and terminates in an annular portion 3 provided, if desired, with a tire bead engaging flange 3'. As shown said annular member 3 forms only one-half of the pneumatic support and the other half is formed in a separate part 4 of complemental cross section, and is secured to the support 1 by bolts 18.

When a pneumatic member is used the same may consist of an envelop 6 provided with an air tube 5 and the bead portions of the envelop 6 may be clamped between the flange 3' and a similar flange 4' on the part 4. If desired the peripheral surface of the envelop 6 may be recessed at 6' to receive a band 8 which completely encircles the envelop 6 as will be seen by reference to Fig. 2. A band 7, which as shown is formed in two parts, is superimposed upon the band 8 and the sections of the band 7 are of such length as to separate the ends 7' thereof when the same are in place, as will be readily seen by reference to Fig. 2. The openings or spaces between the ends of the bands 7 are arranged at diametrically opposite points of the member and the inner ends of springs 11 are interposed between the ends 7' and against the outer surface of the band 8. It will thus be seen that the band 8 protects the envelop 6 from injury due to sudden movements of the springs 11. As shown the springs 11 are anchored to the bands 7 and 8 by anchoring members 10 provided with flanges which are shown as riveted to the bands 8, and bolted to the springs 11. The outer ends of the springs 11 are connected, preferably pivotally, with the frame 12 of the vehicle.

I claim:—

1. An elastic suspension for vehicles comprising in combination with the axle and frame, an annular support concentrically mounted on the axle, an annular yielding member mounted on said support, inner and outer band surrounding said member, springs connected to the ends of the outer band at points on diametrically opposite sides of said member, and connections between said springs and the frame of the vehicle.

2. An elastic suspension for vehicles comprising in combination with the axle and frame, an annular support concentrically mounted on said axle, an annular pneumatic member mounted on said support, inner and outer band surrounding said member, springs on opposite sides of the outer band, the inner ends of said springs being anchored to the ends of said band at diametrically opposite points thereof, and means connecting the outer ends of said springs to the vehicle frame.

3. An elastic suspension for vehicles comprising in combination with the axle and frame, an annular support concentrically mounted on said axle, an annular pneumatic member mounted on said support, a continuous band surrounding said member, a two part band surrounding said continuous band, springs on opposite sides of said member, the inner ends of said springs abutting against said continuous band and being anchored thereto and to the ends of said two part band, and means connecting the outer ends of said springs to the vehicle frame.

In testimony whereof I have signed my name to this specification in the presence of two witnesses.

LORENZO BASSO.

Witnesses:
 Luigi Sacco, (fu G. B.,)
 Pio Pina Wain.